(12) United States Patent
Rui

(10) Patent No.: US 8,396,131 B2
(45) Date of Patent: Mar. 12, 2013

(54) METHOD AND SYSTEM FOR OBTAINING MOTION VECTORS AND BOUNDARY STRENGTHS OF AN IMAGE

(75) Inventor: Yan Y. Rui, Shanghai (CN)

(73) Assignee: Fujitsu Semiconductor Limited, Yokohama (JP)

( * ) Notice: Subject to any disclaimer, the term of this patent is extended or adjusted under 35 U.S.C. 154(b) by 418 days.

(21) Appl. No.: 12/606,836

(22) Filed: Oct. 27, 2009

(65) Prior Publication Data
US 2010/0135399 A1    Jun. 3, 2010

(30) Foreign Application Priority Data

Nov. 12, 2008    (CN) .......................... 2008 1 0171819

(51) Int. Cl.
*H04N 7/32* (2006.01)
(52) U.S. Cl. ............... 375/240.16; 375/204.24; 382/238
(58) Field of Classification Search .................. None
See application file for complete search history.

(56) References Cited

U.S. PATENT DOCUMENTS

| 2007/0098076 A1* | 5/2007 | Sun et al. | 375/240.16 |
| 2008/0175315 A1* | 7/2008 | Abe et al. | 375/240.12 |
| 2008/0240252 A1* | 10/2008 | He | 375/240.24 |
| 2009/0034855 A1* | 2/2009 | Chuang | 382/238 |

OTHER PUBLICATIONS

Chinese Office Action dated Dec. 7, 2011, 8 pages.

* cited by examiner

*Primary Examiner* — Christopher S Kelley
*Assistant Examiner* — Mohammed Jebari
(74) *Attorney, Agent, or Firm* — Arent Fox LLP

(57) ABSTRACT

A method and a system for obtaining motion vectors and boundary strengths of an image are disclosed. The method comprises the steps of: S202, determining motion vector prediction direction information and motion vector calculation method information of a block to be decoded currently according to a type of the block to be decoded currently and a type of a macroblock/sub-macroblock in which the block to be decoded currently is located; S204, obtaining related information needed to calculate a motion vector of the block to be decoded currently using the motion vector prediction direction information according to the motion vector calculation method information; and S206, calculating the motion vector of the block to be decoded currently using the related information obtained, and calculating a boundary strength of the block to be decoded currently using the motion vector of the block to be decoded currently.

9 Claims, 4 Drawing Sheets

METHOD AND SYSTEM FOR OBTAINING MOTION VECTORS AND BOUNDARY STRENGTHS OF AN IMAGE

FIELD OF THE INVENTION

The invention relates to image processing, and particularly relates to a method and system for obtaining motion vectors and boundary strengths of an image.

BACKGROUND OF THE INVENTION

Generally, there are two types of methods for calculating motion vectors (MVs) in video decoding standards: calculating methods using information of surrounding blocks or macroblocks (MBs) (hereinafter referred to as NEI_CALC) and calculating methods using information of co-located blocks or MBs (hereinafter referred to as COLO_CALC).

NEI_CALC mainly involves the steps of: finding out relevant information of surrounding blocks of a block to be decoded currently (e.g. relevant information of blocks A, B, C and D as shown in FIG. 1) according to a size of the block to be decoded currently, and calculating a motion vector of the block to be decoded currently according to calculation steps defined in the video decoding standards by using the found information and other information of the block to be decoded currently (e.g. a vector motion difference, a motion vector prediction direction, etc.).

COLO_CALC mainly involves the steps of: finding out information of a co-located block in a backward reference frame (e.g. a motion vector and a reference frame picture index of the co-located block) according to a location of the block to be decoded currently, and calculating a motion vector of the block to be decoded currently according to calculation steps defined in the video decoding standards by using the found information.

Furthermore, methods of calculating boundary strengths (BSs) in the video decoding standards mainly use information of edges of the block to be decoded currently and blocks in which pixels adjacent to the block are located (e.g. microblock types, a quantize parameter (QP) value, block division, a non-zero bit number of block difference data and a difference value of motion vectors of the block) to calculate boundary strengths.

In the H.264 video decoding standard, in the case of a main level in a main profile, the block sizes NEI_CALC relates to range from 16×16 to 4×4, including 16×16, 16×8, 8×16, 8×8, 8×4, 4×8 and 4×4, wherein the smallest block is a 4×4 block, and the calculation modes NEI_CALC relates to include forward prediction (PRED_L0), backward prediction (PRED_L1), bi-directional prediction (PRED_BI) and a P frame skipped calculation mode. The block sizes COLO_CALC relates to involves 16×16 and 8×8 and the calculation modes it relates to includes spatial direct mode and temporal direct mode. Moreover, in the cases of single-directional predication (P frame) and bi-directional prediction (B frame), a prediction mode of calculating a weight value may be needed. For BS calculation, in a macroblock, in the worst case that calculation is performed by using edges of 4×4 blocks, there may be at most 40 sets of different BS values corresponding to different pixels of the macroblock respectively.

As can be seen from the above, the calculations of MV and BS in the video decoding standards have common points, for example, the use of information of surrounding blocks or macroblocks of the block to be decoded currently. However, due to different block sizes as well as complicated and diversified calculation modes when MV and BS are calculated respectively, the usual practice is to divide the calculations of MV and BS into two individual calculation sections and sequentially perform calculations of MV and BS with respect to a macroblock. For example, first of all, MV calculations are performed on blocks in a macroblock according to calculation modes of respective blocks in the macroblock to obtain MV values of all the blocks in the macroblock, then BS values of the macroblock is calculated by using the calculated MV values of all the blocks in the macroblock in combination with other obtainable information of the abovementioned macroblock/blocks. However, the abovementioned practice has the following inherent defects: firstly, calculations of MV and BS cannot be unified and the calculation speeds thereof are not stable due to different blocks and numerous calculation paths thereof; secondly, repetition of similar operations exists in the calculations of MV and BS due to failure to effectively use specific common points therebetween. For instance, in the worst situation that calculations of MV and BS are performed on a 4×4 block by using a calculation mode of bi-directional prediction, the time spent on the calculations of MV and BS is nearly twice as much as the time spent on a single calculation of MV.

SUMMARY OF THE INVENTION

In view of one or more of the problems mentioned above, the present invention provides a method and system for obtaining motion vectors and boundary strengths of an image.

A method for obtaining motion vectors and boundary strengths of an image in accordance with one embodiment of the invention comprises the steps of: S202, determining motion vector prediction direction information and motion vector calculation method information of a block to be decoded currently according to a type of the block to be decoded currently and a type of a macroblock/sub-macroblock in which the block to be decoded currently is located; S204, obtaining related information needed to calculate a motion vector of the block to be decoded currently using the motion vector prediction direction information according to the motion vector calculation method information; and S206, calculating the motion vector of the block to be decoded currently using the related information obtained, and calculating a boundary strength of the block to be decoded currently using the motion vector of the block to be decoded currently.

A system for obtaining motion vectors and boundary strengths of an image in accordance with one embodiment of the invention comprises: a first means configured to determine motion vector prediction direction information and motion vector calculation method information of a block to be decoded currently according to a type of the block to be decoded currently and a type of a macroblock/sub-macroblock in which the block to be decoded currently is located; a second means configured to obtain related information needed to calculate a motion vector of the block to be decoded currently using the motion vector prediction direction information according to the motion vector calculation method information; and a third means configured to calculate the motion vector of the block to be decoded currently using the related information obtained, and calculate a boundary strength of the block to be decoded currently using the motion vector of the block to be decoded currently.

With respect to the abovementioned problems, the invention unifies the calculation modes of MV and BS by means of unifying all the block sizes and different calculation modes into a calculation mode of the smallest 4×4 block, by which, the time spent on the calculations of MV and BS in all the cases is the same and equal to the time spent on a single calculation of MV in the worst situation that calculations of MV and BS are performed on a 4×4 block by using a calculation mode of bi-directional prediction.

DETAILED DESCRIPTION OF THE INVENTION

Specific implementations of the invention are described below in reference with the drawings.

Figure 1:
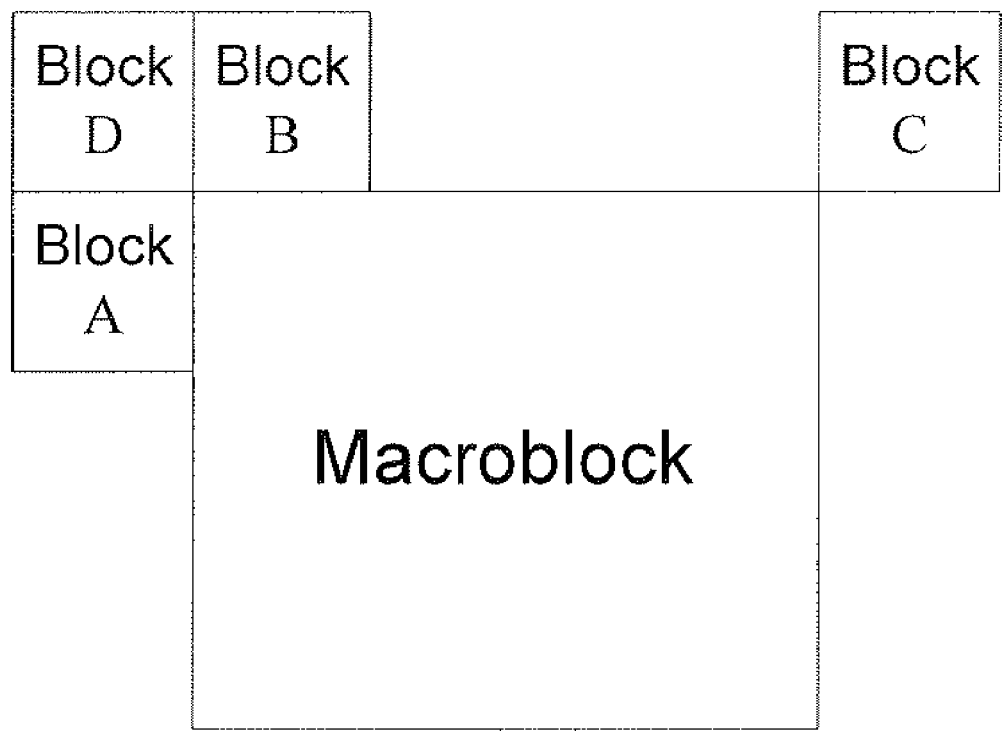
FIG. 1 is a schematic diagram of a block to be decoded currently and surrounding blocks thereof.
Figure 2:
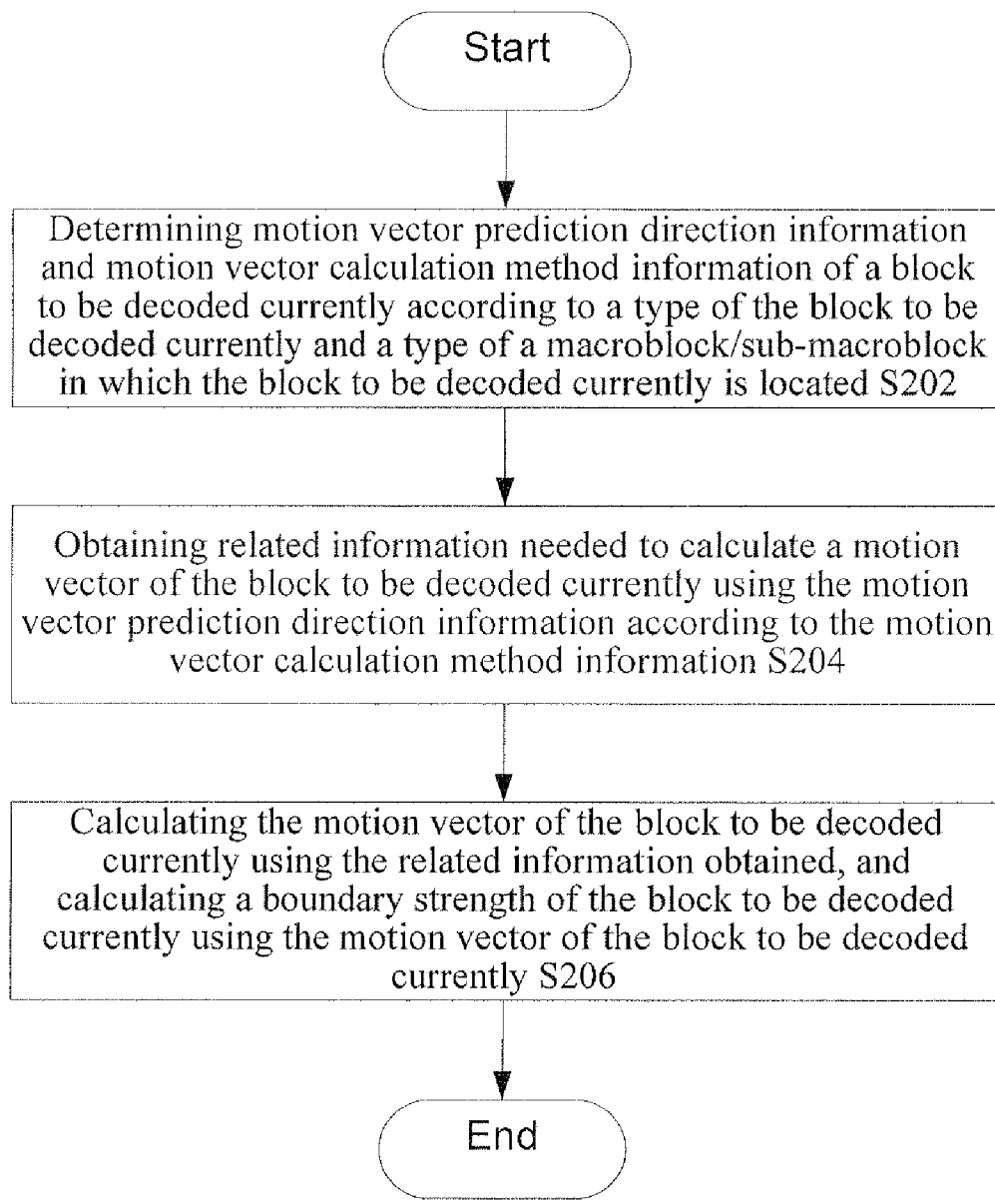
FIG. 2 is a flowchart of a method for obtaining motion vectors and boundary strengths of an image in accordance with one embodiment of the invention.

FIG. 2 is a flowchart of a method for obtaining motion vectors and boundary strengths of an image in accordance with one embodiment of the invention. As shown in FIG. 2, the method comprises the steps of: S202, determining motion vector prediction direction information and motion vector calculation method information of a block to be decoded currently according to a type of the block to be decoded currently and a type of a macroblock/sub-macroblock in which the block to be decoded currently is located; S204, obtaining related information needed to calculate a motion vector of the block to be decoded currently using the motion vector prediction direction information according to the motion vector calculation method information; and S206, calculating the motion vector of the block to be decoded currently using the related information obtained, and calculating a boundary strength of the block to be decoded currently using the motion vector of the block to be decoded currently.

When the motion vector calculation method information indicates calculating the motion vector of the block to be decoded currently by use of a calculation method utilizing surrounding block information, in the step S204, a motion vector difference of the block to be decoded currently and information related to surrounding blocks of the block to be decoded currently is obtained by using the motion vector prediction direction information, and in the step S206, a motion vector prediction value of the block to be decoded currently is calculated by using the information related to surround blocks of the block to be decoded currently, and the motion vector of the block to be decoded currently is calculated by adding the motion vector prediction value and the motion vector difference.

When the motion vector calculation method information indicates calculating the motion vector of the block to be decoded currently by use of a calculation method utilizing collocated block information, in the step S204, information related to a backward reference frame collocated block of the block to be decoded currently is determined according to the motion vector calculation method information, and a reference frame picture serial number of the block to be decoded currently is obtained by using the motion vector prediction direction information, and in the step S206, the motion vector of the block to be decoded currently is calculated by using the information related to the backward reference frame collocated block and the reference frame picture serial number.

When the motion vector calculation method information indicates calculating the motion vector of the block to be decode currently by use of a calculation method utilizing the combination of surrounding block information and collocated block information, in the step S204, information related to surrounding blocks of the block to be decoded currently and information related to a backward reference frame collocated block of the block to be decoded currently is obtained according to the motion vector calculation method information, and in the step S206, a motion vector prediction value of the block to be decoded currently is calculated by using the information related to surrounding blocks, and the motion vector of the block to be decoded currently is calculated by combining the information related to the backward reference frame collocated block and the motion vector prediction value. The information related to the backward reference frame collocated block can be determined from all the information pre-existing in the backward reference frame of the block to be decoded currently according to the motion vector calculation method information.

In any one of the abovementioned two cases, a reference frame picture serial number of the block to be decoded currently can also be obtained by using the motion vector prediction direction information in the step S204, and a weighted prediction value for the motion vector of the block to be decoded currently can be calculated by using the reference frame picture serial number in the step S206.

Specifically, relevant information of surrounding blocks or macroblocks for obtaining MVs and BSs of an image can be preserved in advance. In this embodiment, 4×4 block information of all the 16 4×4 blocks in a macroblock/sub-macroblock is preserved for calculating MV and BS values of any one of the 4×4 blocks in the macroblock/sub-macroblock. In an algorithm for NEI_CALC based on a row cache, in the case of macroblock adaptive frame/field coding (MBAFF), relevant information of at least two rows of 4×4 blocks, which are adjacent to the macroblock in which a 4×4 block to be decoded is located, generally needs to be preserved for calculating MV and BS values of the 4×4 block to be decoded; in the case of non-MBAFF, relevant information of at least one row of 4×4 blocks, which are adjacent to the macroblock/sub-macroblock in which the 4×4 block to be decoded is located, needs to be preserved for calculating MV and BS values of the 4×4 block to be decoded. In an algorithm for COLO_CALC based on a frame cache, relevant information of blocks or macroblocks in the backward reference frame needs to be preserved specially, and at least co-location information (COLO_INFO) of an entire frame needs to be preserved for each reference frame.

Figure 3:
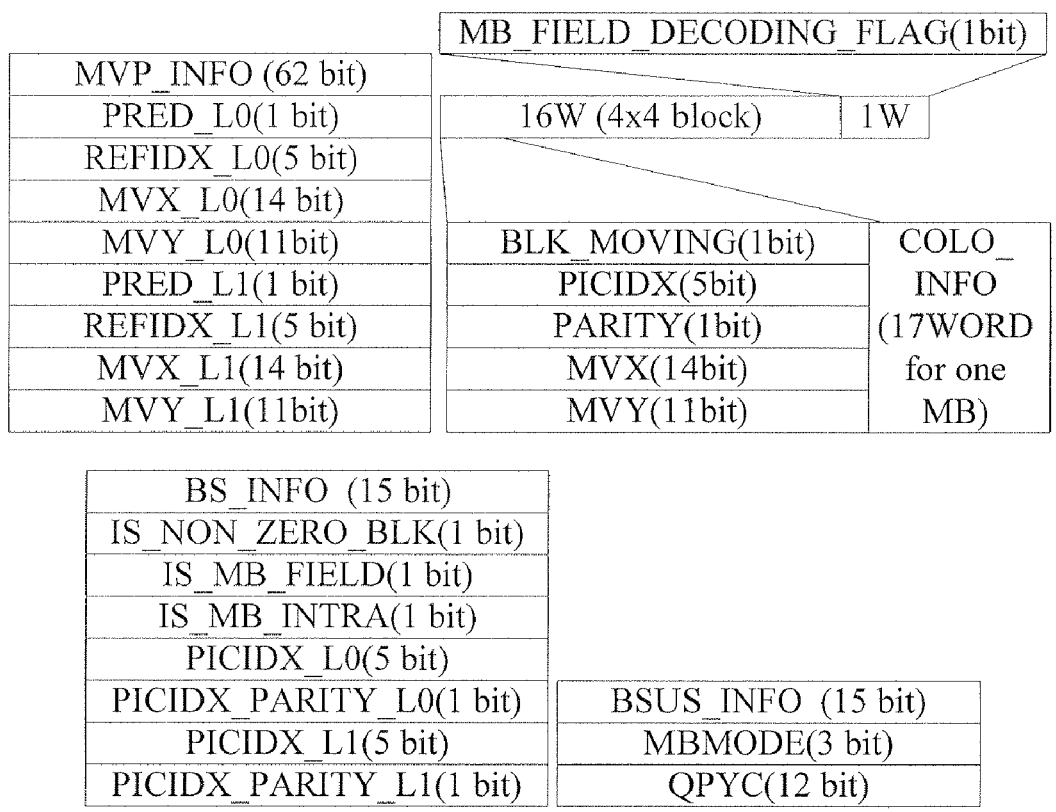
FIG. 3 is a schematic diagram of motion vector preservation information (MVP_INFO) and co-location preservation information (COLO_INFO) for MV calculation as well as boundary strength preservation information (BS_INFO) and boundary strength macroblock preservation information (BSUS_INFO) for BS calculation in accordance with one embodiment of the invention.

FIG. 3 illustrates MVP_INFO and COLO_INFO for MV calculation and BS_INFO and BSUS_INFO for BS calculation, which is used to preserve macroblock information of the previous row required by BS calculation. As shown in FIG. 3, the motion vector preservation information (MVP_INFO) includes a forward prediction direction-indicating signal (PRED_L0), a forward reference picture index value (REFIDX_L0), a forward horizontal direction motion vector value (MVX_L0), a forward vertical direction motion vector value (MVY_L0), a backward prediction direction-indicating signal (PRED_L1), a backward reference picture index value (REFIDX_L1), a backward horizontal direction motion vector value (MVX_L1) and a backward vertical direction motion vector value (MVY_L1); the co-location preservation information (COLO_INFO) includes a field-coding macroblock pair indication signal (MB_FIELD_DECODING_FLAG), a block motion indication signal (BLK_MOVING), a real reference picture tag value (PICIDX), a reference frame parity field selection signal (PARITY), a horizontal direction motion vector value (MVX) and a vertical direction motion vector value (MVY); the boundary strength preservation information (BS_INFO) includes a non-zero difference block indication signal (IS_NON_ZERO_BLK), a macroblock field-coding indication signal (IS_MB_FIELD), a macroblock intra-frame coding indication signal (IS_MB_INTRA), a forward reference picture tag value (PICIDX_L0) that uniquely records a corresponding forward reference picture, a forward reference picture parity field selection signal (PICIDX_PARITY_L0), a backward reference picture tag value (PICIDX_L1) that uniquely records a corresponding backward reference picture, and a backward reference picture parity field selection signal (PICIDX_PARITY_L1); and the boundary strength macroblock preservation information (BSUS_INFO) includes a macroblock coding mode (MBMODE) that comprises information on frame field selection of a reference frame and macroblock adaptive frame/field coding and a macroblock quantized value (QPYC) that comprises a brightness block quantized value and a chrominance block quantized value.

In this embodiment, iteration calculation based on 12 cycles is performed on each of the 16 4×4 blocks of each macroblock, regardless of NEI_CALC or COLO_CALC. When the iteration calculation is started, the following control signals related to a 4×4 block to be decoded currently for controlling the execution of relevant operations in the iteration calculation are given according to the type of a macroblock/sub-macroblock in which the 4×4 block to be decoded currently is located and the type of the 4×4 block to be decoded currently: PRED_L0 and PRED_L1 for giving MV prediction directions of the 4×4 block to be decoded currently that correspond to forward prediction and backward prediction respectively; MVD_EN for determining whether motion vector difference (MVD) information related with the 4×4 block to be decoded currently exists; MV_EN for determining whether to perform MV calculation on the 4×4 block to be decoded currently; COLO_EN for determining whether to perform COLO_CALC calculation on the 4×4 block to be decoded currently; and MV_MODE for giving the MV calculation type of the 4×4 block to be decoded currently.

The process of calculating motion vectors and boundary strengths based on the smallest divided block (4×4) is described below with respect to the main profile and the main level in the H.264 video decoding standard. Calculation modes of motion vectors and boundary strengths based on a 4×4 block that NEI_CALC relates to include forward prediction (PRED_L0), backward prediction (PRED_L1), bi-directional prediction (PRED_B1) and a P skipped macroblock (PSKIP) calculation mode.

In the calculation process of motion vectors and boundary strengthen based on the 4×4 block that NEI_CALC relates to, in the second, third, fourth and fifth cycles, motion vector preservation information (MVP_INFO) of blocks on the left side (NEI_A), the top side (NEI_B), the right-top side (NEI_C) and the left-top side (NEI_D) of a block in which the 4×4 block to be decoded currently is located is obtained respectively, wherein the block can be a block in a macroblock or a sub-macroblock;

in the second and third cycles, the forward motion vector difference (MVD_L0) corresponding to the forward prediction direction-indicating signal (PRED_L0) and the backward motion vector difference (MVD_L1) corresponding to the backward prediction direction-indicating signal (PRED_L1) are obtained respectively;

in the fourth and fifth cycles, the real forward reference picture tag value (PICIDX_L0) corresponding to the forward prediction direction indicating signal (PRED_L0) and the real backward reference picture tag value (PICIDX_L1) corresponding to the backward prediction direction indicating signal (PRED_L1) are obtained respectively;

in the fourth and fifth cycles, original boundary strength values corresponding to a left-side boundary strength (BS_L) and a top-side boundary strength (BS_T) of the 4×4 block to be decoded currently are calculated by using information of a vertical edge on the left and a horizontal edge on the top of the 4×4 block to be decoded currently and information of the blocks in which pixels adjacent to the vertical edge and the horizontal edge are located, for example, macroblock types, quantized parameters, block division and the non-zero bit number of block difference data in the sixth and seventh cycles, the forward reference frame picture serial number (POC_L0) corresponding to the forward prediction direction indicating signal (PRED_L0) and the backward reference frame picture serial number (POC_L1) corresponding to the backward prediction direction indicating signal (PRED_L1) are obtained, respectively;

in the sixth and eighth cycles, the forward motion vector prediction value (MVP_L0) corresponding to the forward prediction direction indicating signal (PRED_L0) and the backward motion vector prediction value (MVP_L1) corresponding to the backward prediction direction indicating signal (PRED_L1) are obtained respectively according to the motion vector preservation information (MVP_INFO) of blocks on the left side (NEI_A), the top side (NEI_B), the right-top side (NEI_C) and the left-top side (NEI_D) of the block in which the 4×4 block to be decoded currently is located;

in the seventh and ninth cycles, the forward motion vector difference (MVD_L0) and the backward motion vector difference (MVD_L1) are added to the forward motion vector prediction value (MVP_L0) and the backward motion vector prediction value (MVP_L1) respectively to obtain the forward motion vector (MV_L0) and the backward motion vector (MV_L1) as calculation results of motion vectors;

in the eighth cycle, the difference (TD) between the picture serial number (POC_CUR) of the frame in which the 4×4 block to be decoded currently is located and the forward reference frame picture serial number (POC_L0) is calculated;

in the ninth cycle, the difference (TB) between the forward reference frame picture serial number (POC_L0) and the backward reference frame picture serial number (POC_L1) is calculated;

in the tenth cycle, a weighted scale factor (DistScaleFactor) is calculated according to the difference TD and the difference TB;

in the eleventh cycle, a forward scale factor (W0) and a backward scale factor (W1) as results of weighted prediction calculation is calculated according to the weighted scale factor (DistScaleFactor);

in the tenth and eleventh cycles, the left-side boundary strength (BS_L) and the top-side boundary strength (BS_T) of the 4×4 block to be decoded currently are calculated as results of boundary strength (BS) calculation according to the original boundary strength values of the left-side boundary strength (BS_L) and the top-side boundary strength (BS_T) of the 4×4 block to be decoded currently, the motion vector preservation information (MVP_INFO) of the blocks on the left side (NEI_A), the top side (NEI_B), the right-top side (NEI_C) and the left-top side (NEI_D) of the blocks in which the 4×4 block to be decoded currently is located, and the forward motion vector (MV_L0) and the backward motion vector (MV_L1) of the 4×4 block to be decoded currently; and finally in the eleventh cycle, the motion vector preservation information (MVP_INFO) and the co-location preservation information (COLO_INFO) of the 4×4 block to be decoded currently is written into the row cache.

Next, the calculation process of motion vectors and boundary strengths based on a 4×4 block in the spatial direct mode is described as follows:

in the second cycle, co-location preservation information (COLO_INFO) of a co-located block in the backward reference frame of the 4×4 block to be decoded currently is obtained;

in the third cycle, a co-located block motion tag (colZeroFlag) is calculated according to the co-location preservation information (COLO_INFO);

in the fourth and fifth cycles, the real forward reference picture tag value (PICIDX_L0) corresponding to the forward prediction direction indicating signal (PRED_L0) and the real backward reference picture tag value (PICIDX_L1) corresponding to the backward prediction direction indicating signal (PRED_L1) are obtained, respectively;

in the fourth and fifth cycles, original boundary strength values corresponding to a left-side boundary strength (BS_L) and a top-side boundary strength (BS_T) of the 4×4 block to be decoded currently are calculated by using information of a vertical edge on the left and a horizontal edge on the top of the 4×4 block to be decoded currently and information of blocks in which pixels adjacent to the vertical edge and the horizontal edge are located, for example, macroblock types, quantized parameters, block division and the non-zero bit number of block difference data;

in the fourth and fifth cycles, the forward motion vector (MVP_L0) corresponding to the forward prediction direction indicating signal (PRED_L0) and the backward motion vector (MVP_L1) corresponding to the backward prediction direction indicating signal (PRED_L1) are obtained respectively as results of motion vector calculation according to a individually calculated default motion vector prediction value particular to the spatial direct mode and the co-located block motion tag (ColZeroFlag);

in the sixth and seventh cycles, the forward reference frame picture serial number (POC_L0) corresponding to the forward prediction direction indicating signal (PRED_L0) and the backward reference frame picture serial number (POC_L1) corresponding to the backward prediction direction indicating signal (PRED_L1) are obtained, respectively;

in the eighth cycle, the difference (TD) between the image serial number (POC_CUR) of the frame in which the 4×4 block to be decoded currently is located and the forward reference frame picture serial number (POC_L0) is calculated;

in the ninth cycle, the difference (TB) between the forward reference frame picture serial number (POC_L0) and the backward reference frame picture serial number (POC_L1) is calculated;

in the tenth cycle, a weighted scale factor (DistScaleFactor) is calculated according to the difference TD and the difference TB;

in the eleventh cycle, a forward scale factor (W0) and a backward scale factor (W1) are calculated as results of weighted prediction calculation according to the weighted scale factor (DistScaleFactor);

in the tenth and eleventh cycles, the left-side boundary strength (BS_L) and the top-side boundary strength (BS_T) of the 4×4 block to be decoded currently are calculated as results of boundary strength (BS) calculation according to the original boundary strength values of the left-side boundary strength (BS_L) and the top-side boundary strength (BS_T) of the 4×4 block to be decoded currently, the motion vector preservation information (MVP_INFO) of the blocks on the left side (NEI_A), the top side (NEI_B), the right-top side (NEI_C) and the left-top side (NEI_D) of the block in which the 4×4 block to be decoded currently is located, and the forward motion vector (MV_L0) and the backward motion vector (MV_L1) of the 4×4 block to be decoded currently; and finally in the eleventh cycle, the motion vector preservation information (MVP_INFO) and the co-location preservation information (COLO_INFO) of the 4×4 block to be decoded currently is written into the row cache.

Next, the calculation process of motion vectors and boundary strengths based on a 4×4 block in the temporal direct mode is described as follows:

in the second cycle, the co-location preservation information (COLO_INFO) of a co-located block in the backward reference frame of the 4×4 block to be decoded currently is obtained;

in the fourth cycle, the forward reference frame picture serial number (POC_L0) corresponding to the forward prediction direction indicating signal (PRED_L0) and the backward reference frame picture serial number (POC_L1) corresponding to the backward prediction direction indicating signal (PRED_L1) are obtained;

in the fifth cycle, the real forward reference picture tag value (PICIDX_L0) corresponding to the forward prediction direction indicating signal (PRED_L0) and the real backward reference picture tag value (PICIDX_L1) corresponding to the backward prediction direction indicating signal (PRED_L1) are obtained;

in the fifth cycle, the difference (TD) between the picture serial number (POC_CUR) of the frame in which the 4×4 block to be decoded currently is located and the forward reference frame picture serial number (POC_L0) is calculated;

in the sixth cycle, the difference (TB) between the forward reference frame picture serial number (POC_L0) and the backward reference frame picture serial number (POC_L1) is calculated;

in the seventh cycle, a weighted scale factor (DistScaleFactor) is calculated according to the difference TD and the difference TB;

in the fourth and fifth cycles, the forward motion vector (MVP_L0) corresponding to the forward prediction direction indicating signal (PRED_L0) and the backward motion vector (MVP_L1) corresponding to the backward prediction direction indicating signal (PRED_L1) are obtained as results of motion vector (MV) calculation according to a individually calculated default motion vector prediction value particular to the spatial direct prediction mode and the co-located block location motion tag (ColZeroFlag);

in the eighth and ninth cycles, values of the forward horizontal direction motion vector (MVP_L0_MVX) corresponding to the forward prediction direction indicating signal (PRED_L0) and the backward horizontal direction motion vection (MVP_L1_MVX) corresponding to the backward prediction direction indicating signal (PRED_L1) and motion vector calculation results of the forward vertical direction motion vector (MVP_L0_MVY) corresponding to the forward prediction direction indicating signal (PRED_L0) and the backward vertical direction motion vector (MVP_L1_MVY) corresponding to the backward prediction direction indicating signal (PRED_L1) are obtained, respectively;

in the eleventh cycle, a forward scale factor (W0) and a backward scale factor (W1) are calculated as results of weighted prediction calculation according to the weighted scale factor (DistScaleFactor);

in the tenth and eleventh cycles, the left-side boundary strength (BS_L) and the top-side boundary strength (BS_T) of the 4×4 block to be decoded currently are calculated as results of boundary strength (BS) calculation according to the original boundary strength values of the left-side boundary strength (BS_L) and the top-side boundary strength (BS_T) of the 4×4 block to be decoded currently, the motion vector preservation information (MVP_INFO) of the blocks on the left side (NEI_A), the top side (NEI_B), the right-top side (NEI_C) and the left-top side (NEI_D) of the block in which the 4×4 block to be decoded currently is located, and the forward motion vector (MV_L0) and the backward motion vector (MV_L1) of the 4×4 block to be decoded currently; and finally in the eleventh cycle, the motion vector preservation information (MVP_INFO) and the co-location preservation information (COLO_INFO) of the 4×4 block to be decoded currently is written into the row cache.

As can be seen from the above, by means of the present invention, MV and BS values of a macroblock can be obtained only through a process of traversing all the smallest divided blocks (herein referring to the 4×4 blocks) in the macroblock. Values of MV and BS of a smallest divided block can be obtained whenever the smallest divided block is solved with an iterative method.

Figure 4:
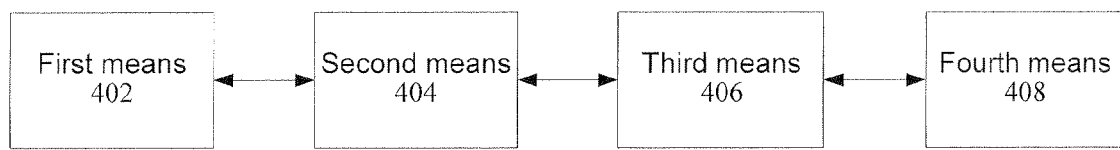
FIG. 4 is a block diagram of a system for obtaining motion vectors and boundary strengths of an image in accordance with one embodiment of the invention.

FIG. 4 is a block diagram of a system for obtaining motion vectors and boundary strengths of an image in accordance with one embodiment of the invention. As shown in FIG. 4, the system comprises: a first means 402 configured to determine motion vector prediction direction information and motion vector calculation method information of a block to be decoded currently according to a type of the block to be decoded currently and a type of a macroblock/sub-macroblock in which the block to be decoded currently is located; a second means 404 configured to obtain related information needed to calculate a motion vector of the block to be decoded currently using the motion vector prediction direction information according to the motion vector calculation method information; and a third means 406 configured to calculate the motion vector of the block to be decoded currently using the related information obtained, and calculate a boundary strength of the block to be decoded currently using motion vectors of the block to be decoded currently and surrounding blocks thereof.

If the motion vector calculation method information indicates calculating the motion vector of the block to be decoded currently by use of a calculation method utilizing surrounding block information, the second means obtains a motion vector difference of the block to be decoded currently and information related to surrounding blocks of the block to be decoded currently using the motion vector prediction direction information, and the third means calculates a motion vector prediction value of the block to be decoded currently using the information related to surrounding blocks, and the motion vector of the block to be decoded currently by adding the motion vector prediction value and the motion vector difference.

If the motion vector calculation method information indicates calculating the motion vector of the block to be decoded currently by use of a calculation method utilizing collocated block information, the second means determines information related to a backward reference frame collocated block of the block to be decoded currently according to the motion vector calculation method information, and obtains a reference frame picture serial number of the block to be decoded currently using the motion vector prediction direction information, and the third means calculates the motion vector of the block to be decoded currently using the information related to the backward reference frame collocated block and the reference frame picture serial number.

If the motion vector calculation method information indicates calculating the motion vector of the block to be decode currently by use of a calculation method utilizing the combination of surrounding block information and collocated block information, the second means obtains information related to surrounding blocks of the block to be decoded currently and information related to a backward reference frame collocated block of the block to be decoded currently according to the motion vector calculation method information, and the third means calculates a motion vector prediction value of the block to be decoded currently using the information related to surrounding blocks, and the motion vector of the block to be decoded currently by combining the information related to the backward reference frame collocated block and the motion vector prediction value.

Furthermore, the second means further obtains a reference frame picture serial number of the block to be decoded currently using the motion vector prediction direction information, and the third means further calculates a weighted prediction value for the motion vector of the block to be decoded currently using the reference frame picture serial number.

The system for obtaining motion vectors and boundary strengths of an image in accordance with the embodiment of the invention further comprises: a fourth means 408 configured to obtain an initial boundary strength of the block to be decoded currently using the type of the macroblock/sub-macroblock in which the block to be decoded currently is located and other information needed to obtain the initial boundary strength, and to calculate the boundary strength of the block to be decoded currently using the initial boundary strength and the motion vectors of the block to be decoded currently and the surrounding blocks thereof.

Specifically, the block to be decoded currently is a 4×4 size block. If the motion vector calculation method information indicates calculating the motion vector of the block to be decoded currently by use of the calculation method utilizing surrounding block information, the system saves information related to 4×4 size blocks in the lowest row of the macroblock/sub-macroblock in which the block to be decoded currently is located after finishing calculations of motion vectors of all the blocks in the macroblock/sub-macrblock in which the block to be decoded is located. Furthermore, the first means is further configured to generate the following signals according to the type of the block to be decoded currently and the type of the macroblock/sub-macroblock in which the block to be decoded currently is located: a signal for controlling motion vector prediction direction, a signal for indicating motion vector difference existence, a signal for controlling motion vector calculation, a signal for controlling collocated position calculation, and a signal for indicating motion vector calculation type.

The person skilled in the art will understand that more alternative implementations and improvements can be used to implement the invention, and the abovementioned implementations and examples are merely descriptions of one or more embodiments. Therefore, the scope of the invention is defined only by the claims.

What is claimed is:

1. A method for obtaining motion vectors and boundary strengths of an image, comprising:

determining motion vector prediction direction information and motion vector calculation method information of a block to be decoded currently according to a type of the block to be decoded currently and a type of a macroblock/sub-macroblock in which the block to be decoded currently is located;

obtaining related information needed to calculate a motion vector of the block to be decoded currently using the motion vector prediction direction information according to the motion vector calculation method information; and calculating the motion vector of the block to be decoded currently using the related information obtained, and calculating a boundary strength of the block to be decoded currently using motion vectors of the block to be decoded currently and surrounding blocks of the block to be decoded currently, wherein a time for calculating the motion vector is equal to a time for calculating the boundary strength.

2. The method according to claim 1, characterized in when the motion vector calculation method information indicates calculating the motion vector of the block to be decoded currently by use of a calculation method utilizing surrounding block information, in case of obtaining the related information, obtaining a motion vector difference of the block to be decoded currently and information related to surrounding blocks of the block to be decoded currently using the motion vector prediction direction information, and in case of calculating the motion vector of the block to be decoded currently, calculating a motion vector prediction value of the block to be decoded currently using the information related to surround blocks of the block to be decoded currently, and calculating the motion vector of the block to be decoded currently by adding the motion vector prediction value and the motion vector difference.

3. The method according to claim 1, characterized in when the motion vector calculation method information indicates calculating the motion vector of the block to be decoded currently by use of a calculation method utilizing collocated block information, in case of obtaining the related information, determining information related to a backward reference frame collocated block of the block to be decoded currently according to the motion vector calculation method information, and obtaining a reference frame picture serial number of the block to be decoded currently using the motion vector prediction direction information, and in case of calculating the motion vector of the block to be decoded currently, calculating the motion vector of the block to be decoded currently using the information related to the backward reference frame collocated block and the reference frame picture serial number.

4. The method according to claim 1, characterized in when the motion vector calculation method information indicates calculating the motion vector of the block to be decode currently by use of a calculation method utilizing the combination of surrounding block information and collocated block information, in case of obtaining the related information, obtaining information related to surrounding blocks of the block to be decoded currently and information related to a backward reference frame collocated block of the block to be decoded currently according to the motion vector calculation method information, and in case of calculating the motion vector of the block to be decoded currently, calculating a motion vector prediction value of the block to be decoded currently using the information related to surrounding blocks, and calculating the motion vector of the block to be decoded currently by combining the information related to the backward reference frame collocated block and the motion vector prediction value.

5. The method according to claim 1, characterized in in case of obtaining the related information, further obtaining a reference frame picture serial number of the block to be decoded currently using the motion vector prediction direction information, and in case of calculating the motion vector of the block to be decoded currently, further calculating a weighted prediction value for the motion vector of the block to be decoded currently using the reference frame picture serial number.

6. The method according to claim 1, characterized in obtaining a initial boundary strength of the block to be decoded currently using the type of the macroblock/sub-macroblock in which the block to be decoded currently is located and other information needed to obtain the initial boundary strength before calculating the boundary strength of the block to be decoded currently by using the motion vectors of the block to be decoded currently and the surrounding blocks thereof, and calculating the boundary strength of the block to be decoded currently by using the initial boundary strength and the motion vectors of the block to be decoded currently and the surrounding blocks thereof.

7. The method according to claim 1, characterized in that the block to be decoded currently is a 4 by 4 size block.

8. The method according to claim 7, characterized in when the motion vector calculation method information indicates calculating the motion vector of the block to be decoded currently by use of the calculation method utilizing surrounding block information, saving information related to 4 by 4 size blocks in the lowest row of the macroblock/sub-macroblock in which the block to be decoded currently is located after finishing calculation of motion vectors of all the blocks in the macroblock/sub-macrblock in which the block to be decoded currently is located.

9. The method according to claim 7, characterized in when the motion vector calculation method information indicates calculating the motion vector of the block to be decoded currently by use of the calculation method utilizing collocated block information, determining the information related to the backward reference frame collocated block from all the information pre-existing in the backward reference frame of the block to be decoded currently according to the motion vector calculation method information.

* * * * *